United States Patent
Shah et al.

(10) Patent No.: US 7,301,857 B2
(45) Date of Patent: Nov. 27, 2007

(54) MEDIA PLAYER INCLUDING A RESUME FUNCTION

(75) Inventors: Sujal B Shah, Sterling Heights, MI (US); Nabil M Issa, Novi, MI (US)

(73) Assignee: Chrysler LLC, Auburn Hills, MI (US)

( * ) Notice: Subject to any disclaimer, the term of this patent is extended or adjusted under 35 U.S.C. 154(b) by 594 days.

(21) Appl. No.: 10/632,316

(22) Filed: Aug. 1, 2003

(65) Prior Publication Data
US 2005/0024994 A1    Feb. 3, 2005

(51) Int. Cl.
*G11B 21/08*    (2006.01)
(52) U.S. Cl. .................. 369/30.24; 369/30.36
(58) Field of Classification Search ............ None
See application file for complete search history.

(56) References Cited

U.S. PATENT DOCUMENTS

| | | | |
|---|---|---|---|
| 4,706,233 A * | 11/1987 | d'Alayer de Costemore d'Arc | 369/34.01 |
| 4,841,505 A * | 6/1989 | Aoyagi | 369/30.12 |
| 5,365,502 A * | 11/1994 | Misono | 369/18 |
| 5,463,601 A * | 10/1995 | Yanagisawa | 369/30.26 |
| 5,761,519 A * | 6/1998 | Wada et al. | 713/330 |
| 5,831,946 A * | 11/1998 | De Bie | 369/30.36 |
| 5,974,008 A * | 10/1999 | Lee | 369/30.36 |
| 5,999,694 A * | 12/1999 | Yasuda et al. | 386/70 |
| 6,188,650 B1 * | 2/2001 | Hamada et al. | 369/30.36 |
| 6,388,961 B1 * | 5/2002 | Ijichi | 369/30.36 |
| 6,388,965 B2 * | 5/2002 | Ozawa et al. | 369/47.12 |
| 6,396,777 B1 * | 5/2002 | Thomas | 369/30.24 |
| 6,493,299 B2 * | 12/2002 | Sato | 369/47.12 |
| 6,574,172 B2 * | 6/2003 | Hamada et al. | 369/30.36 |
| 6,631,101 B1 * | 10/2003 | Chan et al. | 369/30.36 |
| 6,704,253 B2 * | 3/2004 | Tanaka | 369/30.24 |
| 6,804,181 B2 * | 10/2004 | Fujisawa et al. | 369/47.12 |
| 7,068,922 B2 * | 6/2006 | Murata | 386/125 |
| 2002/0184180 A1 * | 12/2002 | Debique et al. | 707/1 |

FOREIGN PATENT DOCUMENTS

JP    2002-245709    *  8/2002 ............ 369/30.36

* cited by examiner

*Primary Examiner*—Tan Dinh
(74) *Attorney, Agent, or Firm*—Ralph E. Smith

(57) ABSTRACT

A method and arrangement remembers a last-played position of a recorded medium by associating an identification number with the medium and storing therewith in memory a last-play position of the medium. The identification number of the recorded medium is analyzed after re-insertion of the medium into the player and play is resumed at the last-play position when the identification number corresponds with the identification number previously stored in memory.

3 Claims, 2 Drawing Sheets

MEDIA PLAYER INCLUDING A RESUME FUNCTION

FIELD OF THE INVENTION

The invention generally relates to audio media players having the capability of restarting at a last played position. More specifically, the invention concerns recorded media players capable of restarting at the last played position of such recorded media even after it has been ejected from, and then reinserted in, a playback unit.

BACKGROUND OF THE INVENTION

Current media players, whether in the home or on board a vehicle, do not have the capability of remembering a last-play position, unless the recorded medium is left in the player. For example, a compact disc (CD) player is incapable of restarting the CD at its last played position if the CD was ejected and reinserted into a single CD slot, or was intermittently changed via an automatic CD changer to a new CD. This presents a disadvantage in situations where the CD is a longer playing volume, such as a recorded book, where it would be desirable to resume listening to an extended passage at the point where the CD volume was earlier removed from the player or swapped via a CD changer.

SUMMARY OF THE INVENTION

Accordingly, one aspect of this invention is to provide a method for identifying a recorded medium and remembering its last-played position in a medium player.

Another aspect of this invention is to provide a method for remembering a last-played position of a recorded medium by reading an identification number from a medium in a player and determining a last-play position of the medium. The identification number and last-play position are stored in a player memory. When the medium is re-inserted into the player the identification number is re-read and play is resumed at the last-play position when the re-read identification number corresponds with the identification number previously stored in memory.

In another aspect of the invention an arrangement is provided for saving the last-played position of a recorded medium, where the arrangement has a media player and a central processing unit connected to a non-volatile memory unit. The central processing unit obtains an identification number from the recorded medium in the media player and stores the identification number in the non-volatile memory unit. The central processing unit also obtains a last-played position from the recorded media in the media player and associates the position with the identification number stored memory for later recollection upon reinsertion of the recorded media into the media player.

BRIEF DESCRIPTION OF THE DRAWING

The objects and features of the invention will become apparent from a detailed description taken in conjunction with the drawing, in which.

DETAILED DESCRIPTION

Figure 1:
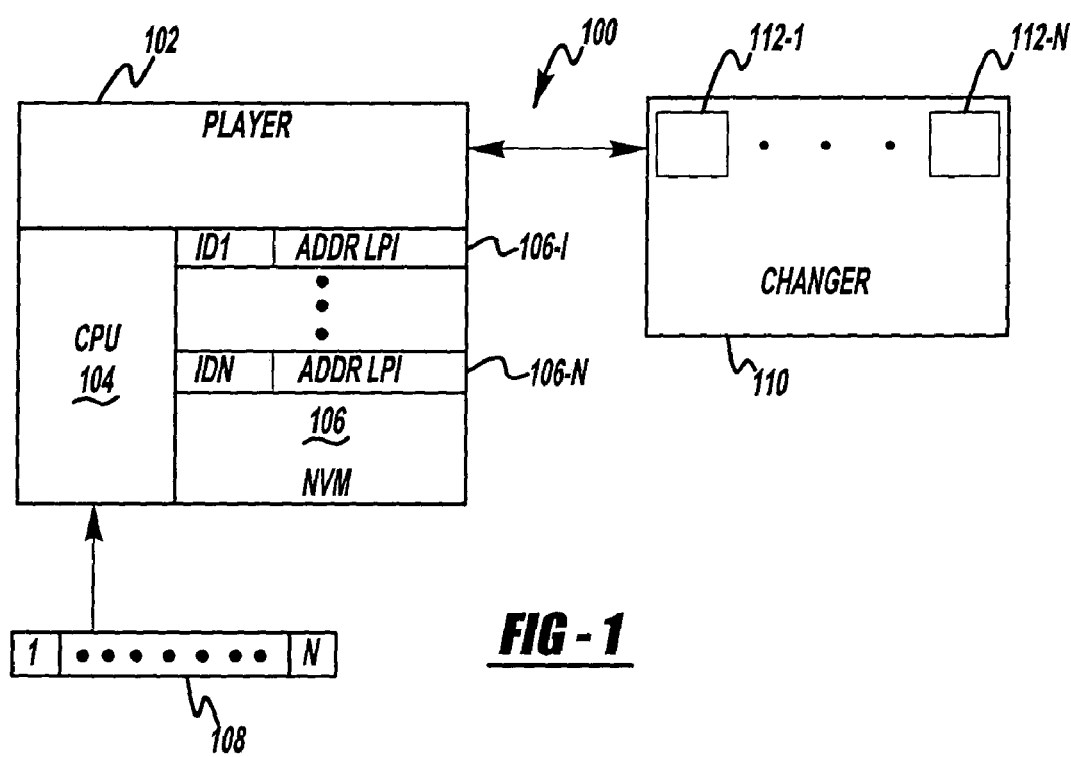
FIG. 1 is a block diagram of an apparatus for remembering last-played positions of recorded media, arranged in accordance with principles of the invention.

FIG. 1 sets forth a system 100 for providing a recorded media player, for example, a CD player in a vehicle, to remember the last-played location on a recorded media volume even after the recorded media volume has been removed and reinserted into the player.

Recorded media player 102 is equipped with a central processing unit 104, such as a microprocessor, having associated non-volatile memory 106. Additionally, as is normally associated with a face plate of the player 102, a plurality of preselect switches 108 is used to select which of a plurality of recorded media volumes from a changer 110 is to be currently played by the player 102.

Non-volatile memory 106 includes memory locations 106-I through 106-N, each corresponding to one of the recorded volumes 112-I through 112-N in the changer 110. Each memory location 106 includes an identification number ID1-N for each volume along with an associated last-play position ADDR LPI of each volume associated with an identification number.

While a changer 110 is shown in FIG. 1, it is to be understood that the principles of the invention work equally well with a single slot media player 102. Ejection, or extraction, is used in this description to mean either physical ejection from a media slot in a single slot player or automatic changeover to a new volume via a changer such as 110.

In order to remember the last-played position of a volume after it has been ejected and reinserted into a player, the player must be capable of identifying the reinserted volume, and remembering the location on that volume when it was last ejected or when play last stopped.

In one aspect of the invention, the identification number may be generated by using characteristics found stored on each disk, such as a table of contents. By way of example, conventional compact discs utilize such a table of contents to store the total number of recorded tracks on the disk along with a total disk playing time. Hence, it has been found that one way to generate the identification number for a disk while it is being played is to read the disk's table of contents to derive the total number of tracks and the total disk playing time. The disk identification number then can be a simple mathematical function of these characteristics found in the table of contents. One such example found to generate a requisite number of unique identification numbers is to use the following:

$$\text{Identification number} = \text{total number of tracks} + (\text{total disk time} \times 5)$$

where the total disk time is expressed in minutes.

In another aspect of the invention, the identification number may be read directly from data on the disk, such as a from a serial number or volume label provided on the disk. It should be appreciated that the identification number need not necessarily be a number. It may also be any other data type recognizable by the player, including character and alphanumeric strings.

Figure 2:
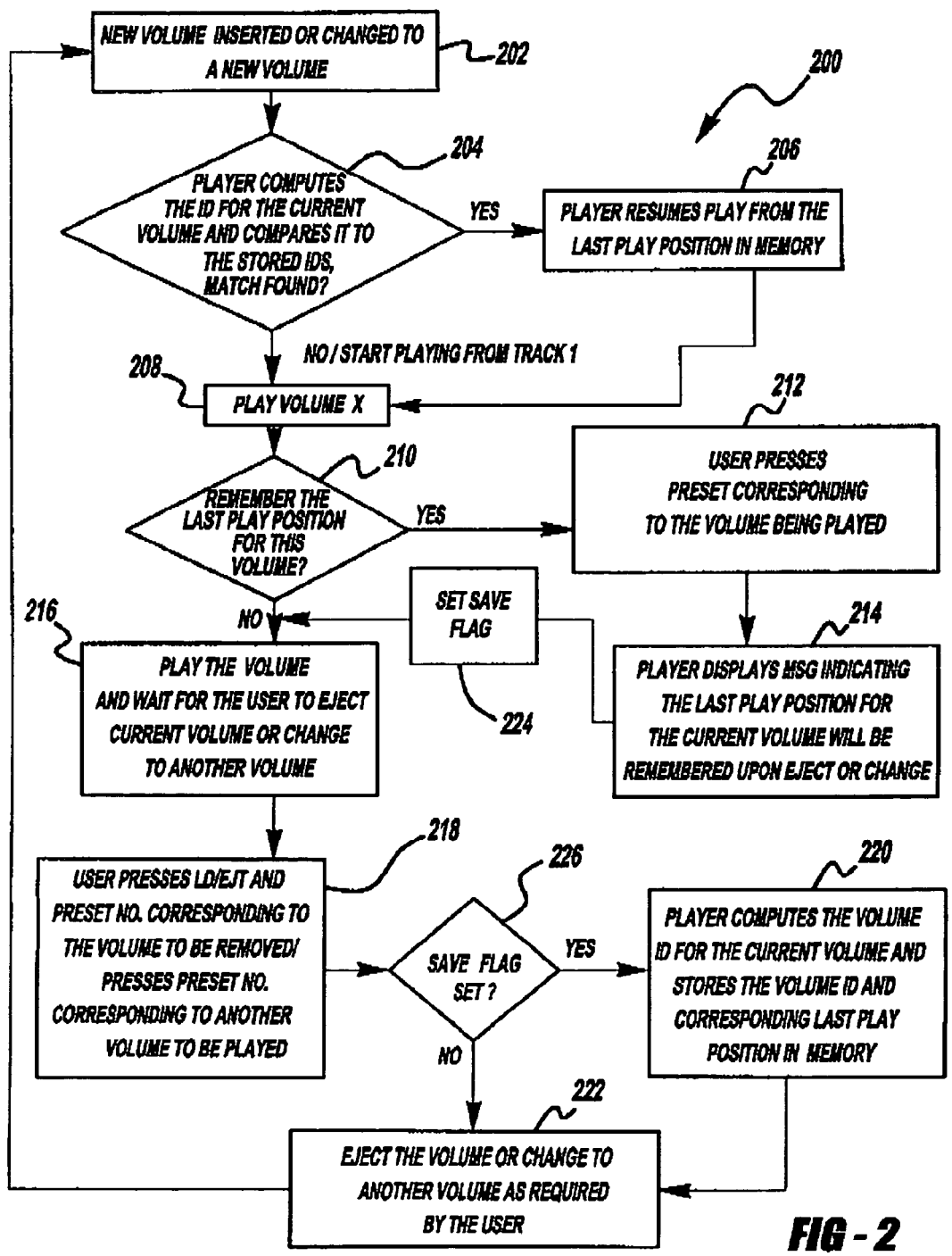
FIG. 2 is a flow chart outlining a method of remembering last-played position of recorded media in accordance with principles of the invention.

The specific method carried out by the microprocessor 104 in the player 102 is best described with reference to the flow chart set forth in FIG. 2. The routine 200 begins at block 202 when a new volume is introduced into the player 102.

The routine next proceeds to decision block 204 wherein player 102 reads or generates the identification number for the current volume and compares it to previously stored identification numbers in the non-volatile memory 106 of the radio player. If a match is found, the player will resume play at step 206 from the last-play position stored in the memory and associated with the matched identification number. If there is no match in the test of 204, then the player will, at step 208, start playing the volume from the beginning.

The routine next proceeds to decision block 210 where the program monitors for a user request to remember the last play position for the current volume. In the specific example described herein, such a request is generated at the preselect switches 108 of FIG. 1 by a user. For example, if Nth volume from the changer is playing and the user wishes to have the player remember the last-played position upon ejection, the user would depress preselect button N as set forth in block 212 of FIG. 2. Upon recognizing the request, the program proceeds to block 214 where the player 102 may display a message indicating that the last-play position will be remembered for this volume upon its ejection. Additionally, at block 224, the routine will set a save flag indicating that a save request has been made.

The routine then proceeds to block 216 where the volume will be played normally waiting for the user to eject it or to change to another volume via a changer 110. At step 218, the program recognizes an ejection request by the user at the radio control panel or the selection of another disk via the changer 110. At decision block 226, if the save flag has not been set, the routine proceeds to block 222 and the volume is ejected or changed as required by the user and the routine proceeds back to starting block 202. If the save flag has been set, then at step 220 the player reads or computes the disk identification for the current volume and stores the volume ID and the corresponding last-play position in the memory 106. Thereafter at step 222 the volume is ejected or changed as required by the user and the routine proceeds back to starting block 202.

If the user had not requested memorization of the last-play position, the save flag would be clear and would inform the routine not to store the last-play position along with the associated identifier.

The invention has been described with respect to a specific example and is not to be limited thereby. The scope and spirit of the invention are to be determined from appropriately interpreted claims.

What is claimed is:

1. A method for remembering a last-played position of a compact disk, said method comprising:

determining a total number of recorded tracks and a total playing time of said compact disk;

generating an identification number by multiplying the total compact disk playing time in minutes by five and adding the total number of recorded tracks on the disk;

determining a last-play position of said compact disk;

storing said identification number and last-play position in a player memory in response to a request by a user to store said Identification number and said last-play position in a player memory; and rereading said identification number after re-insertion of said compact disk into said player, and resuming play at said last-play position when said identification number corresponds with said identification number previously stored in said player memory.

2. The method of claim 1 wherein the player comprises an automotive compact disc (CD) player equipped with a CD changer and a plurality of CD selection switches, wherein said request by a user to store said identification number and said last-play position in a player memory is indicated by said user activating a selection switch corresponding to a CD currently being played.

3. In a system for playing recorded media, an arrangement for saving the last-played position of a recorded medium, the arrangement comprising:

a media player;

a central processing unit connected to a non-volatile memory unit;

in response to a command from a user, the central processing unit obtaining an identification number from the recorded medium in said media player by multiplying the total recorded playing time of the recorded media in minutes by five and adding the number of tracks on the recorded media, and storing said identification number in said non-volatile memory unit;

in response to said command from a user, the central processing unit further obtaining a last-played position from the recorded media in said media player; and associating said position with said identification number stored in said non-volatile memory unit for later recollection upon reinsertion of the recorded media into said media player.

* * * * *